(12) United States Patent
Krause et al.

(10) Patent No.: US 11,390,385 B2
(45) Date of Patent: Jul. 19, 2022

(54) PASSENGER OXYGEN MASK DROP ZONE EXTENDER

(71) Applicant: Rockwell Collins, Inc., Cedar Rapids, IA (US)

(72) Inventors: Gerrit Krause, Stockelsdorf (DE); Detlev Degenhardt, Stockelsdorf (DE); Jan Sebastian Brandes, Lubeck (DE)

(73) Assignee: Rockwell Collins, Inc., Cedar Rapids, IA (US)

(*) Notice: Subject to any disclaimer, the term of this patent is extended or adjusted under 35 U.S.C. 154(b) by 759 days.

(21) Appl. No.: 16/376,573

(22) Filed: Apr. 5, 2019

(65) Prior Publication Data
US 2020/0317348 A1 Oct. 8, 2020

(51) Int. Cl.
*A62B 7/14* (2006.01)
*B64D 11/06* (2006.01)

(52) U.S. Cl.
CPC ............ *B64D 11/0632* (2014.12); *A62B 7/14* (2013.01); *B64D 2231/025* (2013.01)

(58) Field of Classification Search
CPC .... A62B 7/14; A62B 7/12; A62B 7/00; A62B 7/02; A62B 7/04; A62B 7/10; B64D 11/0632; B64D 11/0629; B64D 11/0627; B64D 2231/025; A47B 9/20; F16B 7/10; F16B 7/105
See application file for complete search history.

(56) References Cited

U.S. PATENT DOCUMENTS

| 4,154,237 | A | * | 5/1979 | Courter | B64D 11/00 244/118.6 |
| 7,621,275 | B2 | * | 11/2009 | Fischer | A62B 25/005 128/205.25 |
| 2005/0263156 | A1 | * | 12/2005 | Westphal | B64D 25/00 128/205.13 |
| 2006/0201510 | A1 | * | 9/2006 | Vogt | B64D 11/00 128/204.29 |
| 2019/0126078 | A1 | * | 5/2019 | Lakies | B64D 11/00 |

FOREIGN PATENT DOCUMENTS

EP 1654158 B1 7/2007
EP 1602577 B1 12/2012

OTHER PUBLICATIONS

Extended Search Report for European Application No. 19215200.7 dated Jul. 17, 2020, 6 pages.

* cited by examiner

*Primary Examiner* — Joseph D. Boecker
*Assistant Examiner* — Brian T Khong
(74) *Attorney, Agent, or Firm* — Suiter Swantz pc llo

(57) ABSTRACT

An extension mechanism for a passenger oxygen mask includes a guide block with defined channels to guide the rotation of a telescoping extension arm mechanism. After rotation, a rotating sleeve latch releases an internal telescoping arm that extends a pull flag for the passenger to grab and release the oxygen mask. A pull flag release mechanism releases the pull flag when the extension arm mechanism is fully extended. Combined spring biasing elements keep the pull flag secured in place while stowed and retract a pull flag retention pin at full extension.

20 Claims, 12 Drawing Sheets

PASSENGER OXYGEN MASK DROP ZONE EXTENDER

BACKGROUND

Available space in passenger aircraft is at a premium. Increasing passenger capacity combined with the pressure to utilize overhead space more efficiently means that, in some cases, passengers are removed from the overhead utilities, including passenger oxygen masks. Passengers need access to oxygen masks in the event of an emergency, but there is no facility to add oxygen masks closer to passengers to make them easier to reach.

It would be advantageous if a mechanism existed to place a passenger oxygen mask within reach of a passenger, even when that passenger is not seated in proximity to an overhead oxygen mask compartment, and also avoid any potential obstacles.

SUMMARY

In one aspect, embodiments of the inventive concepts disclosed herein are directed to an extension mechanism for a passenger oxygen mask. A guide block with defined channels guides the rotation of an extension arm mechanism. After rotation, a rotating sleeve latch releases an internal telescoping arm that extends a pull flag for the passenger grab and release the oxygen mask.

In a further aspect, a pull flag release mechanism releases the pull flag when the extension arm mechanism is fully extended. Combined spring biasing elements keep the pull flag secured in place while stowed and retract a pull flag retention pin at full extension.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
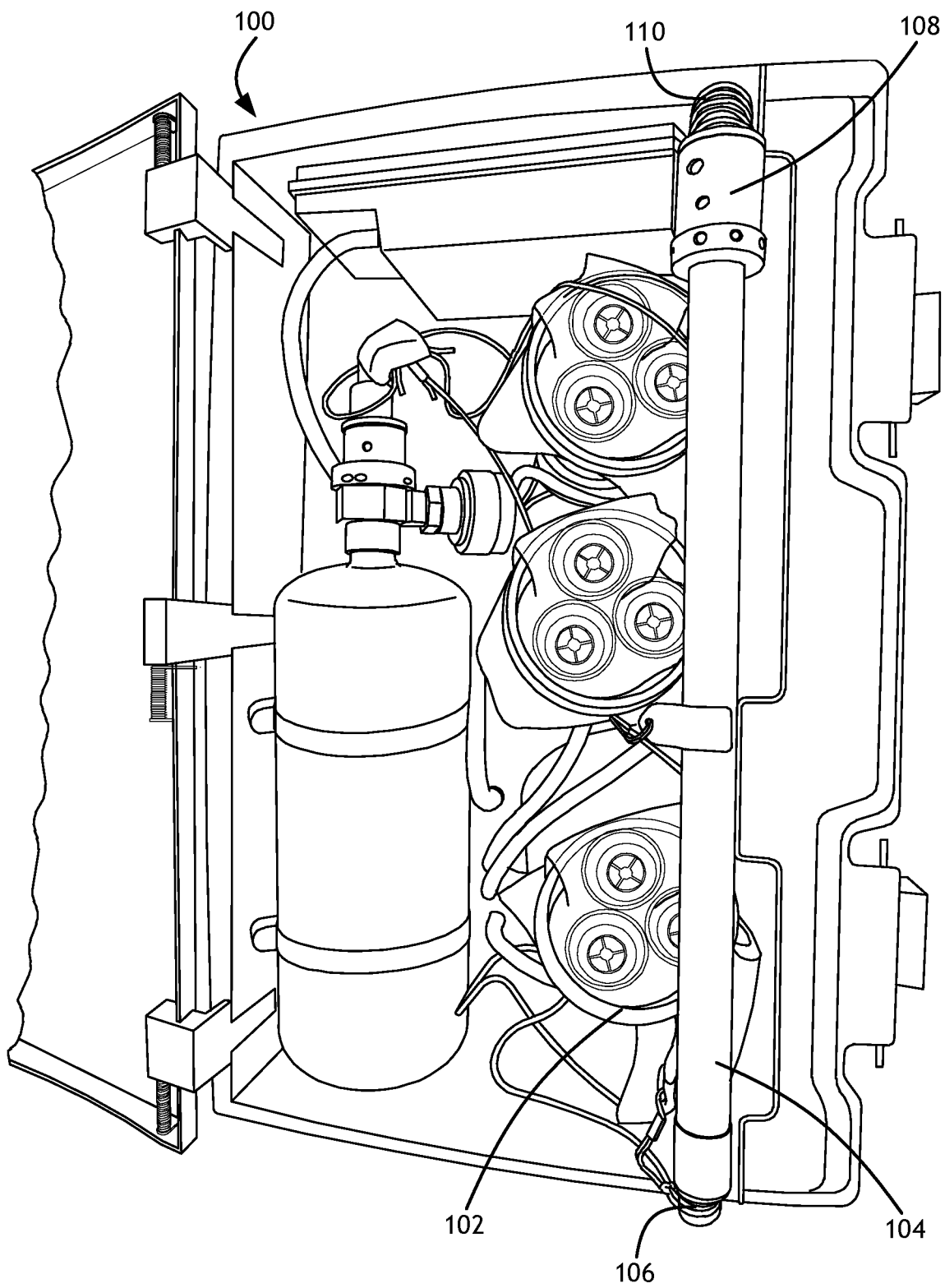
FIG. 1 shows an environmental view of a passenger oxygen mask compartment including an exemplary embodiment of a passenger oxygen mask extender.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a passenger oxygen mask extension system having a guide block to direct the rotation of an extension arm mechanism. After rotation, the extension arm mechanism telescopes outward to place a pull flag within the reach of a passenger to grab and release an oxygen mask. The pull flag may be retained by a spring biased pull flag release pin that only disengages when the telescoping extension arm mechanism reaches maximum extension.

Referring to FIG. 1, an environmental view of a passenger oxygen mask compartment including an exemplary embodiment of a passenger oxygen mask extender is shown. In at least one embodiment, an in-cabin passenger oxygen mask system 100 according to provides passengers access to oxygen masks 102 even when a passenger is seated far from the in-cabin passenger oxygen mask system 100. An extender arm 104 having a pull flag release mechanism 106 is configured to rotate and extend from the in-cabin passenger oxygen mask system 100 via an extension release mechanism 108 and deployment spring 110. When the in-cabin passenger oxygen mask system 100 is deployed, the extender arm 104 is pushed out and rotated to an extension position via the deployment spring 110 and a guide block as more fully described herein.

Figure 2:
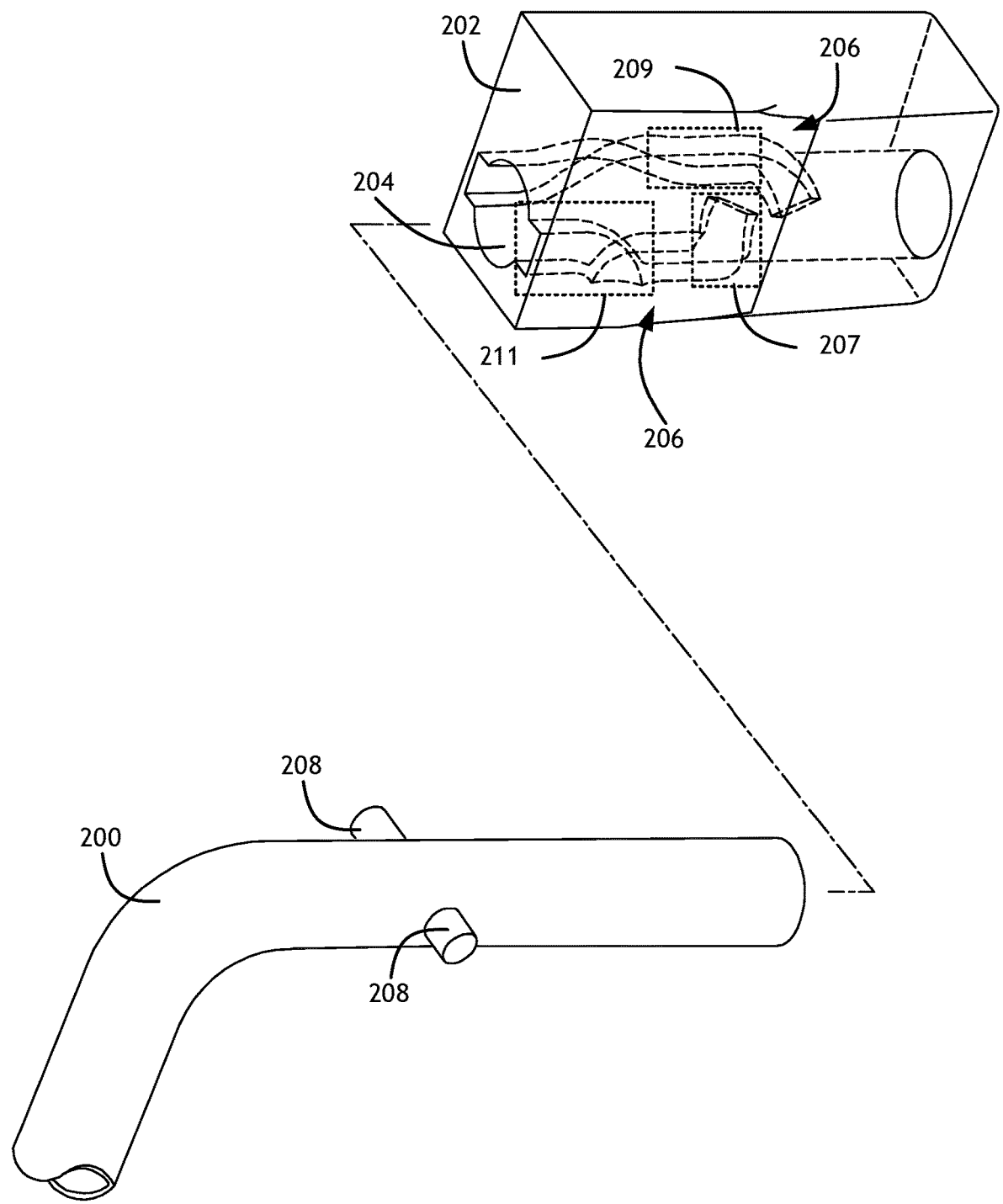
FIG. 2 shows a detail view of an exemplary embodiment of a rotating extender arm according to the inventive concepts disclosed herein.
Figure 3A:
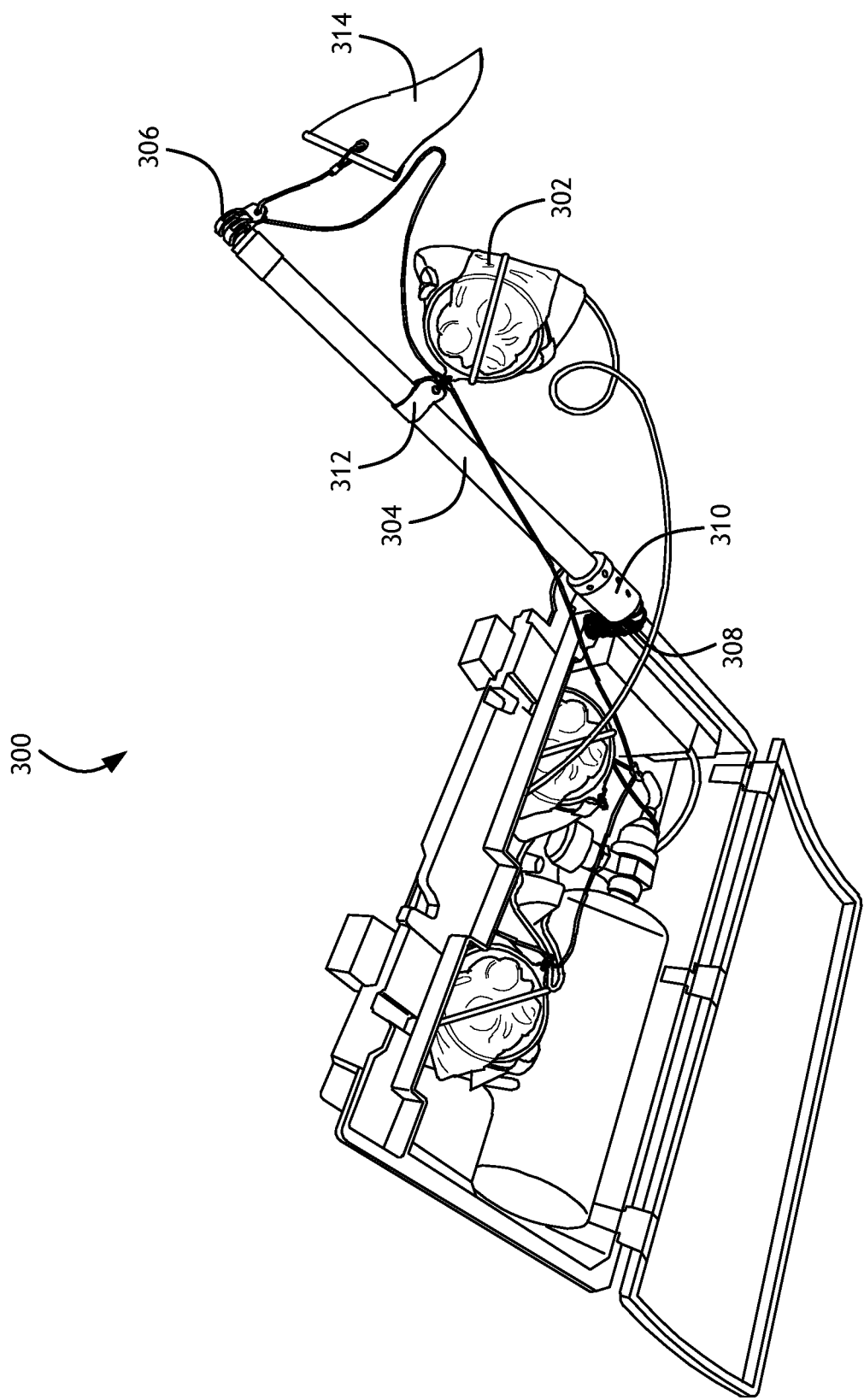
FIG. 3A shows a perspective view of an exemplary embodiment of a passenger oxygen mask extender according to the inventive concepts disclosed herein.
Figure 3B:
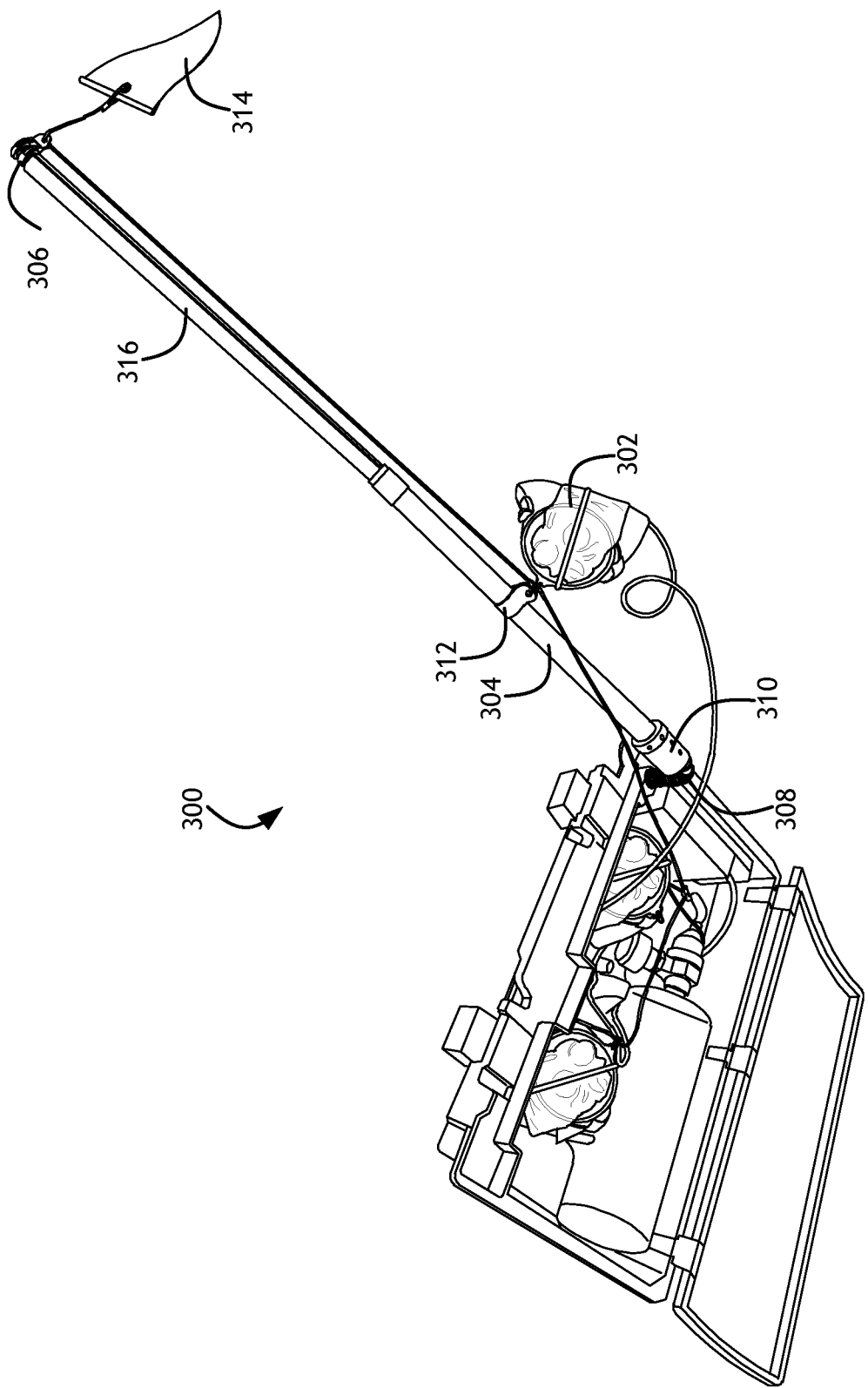
FIG. 3B shows a perspective view of an exemplary embodiment of a passenger oxygen mask extender according to the inventive concepts disclosed herein.
Figure 3C:
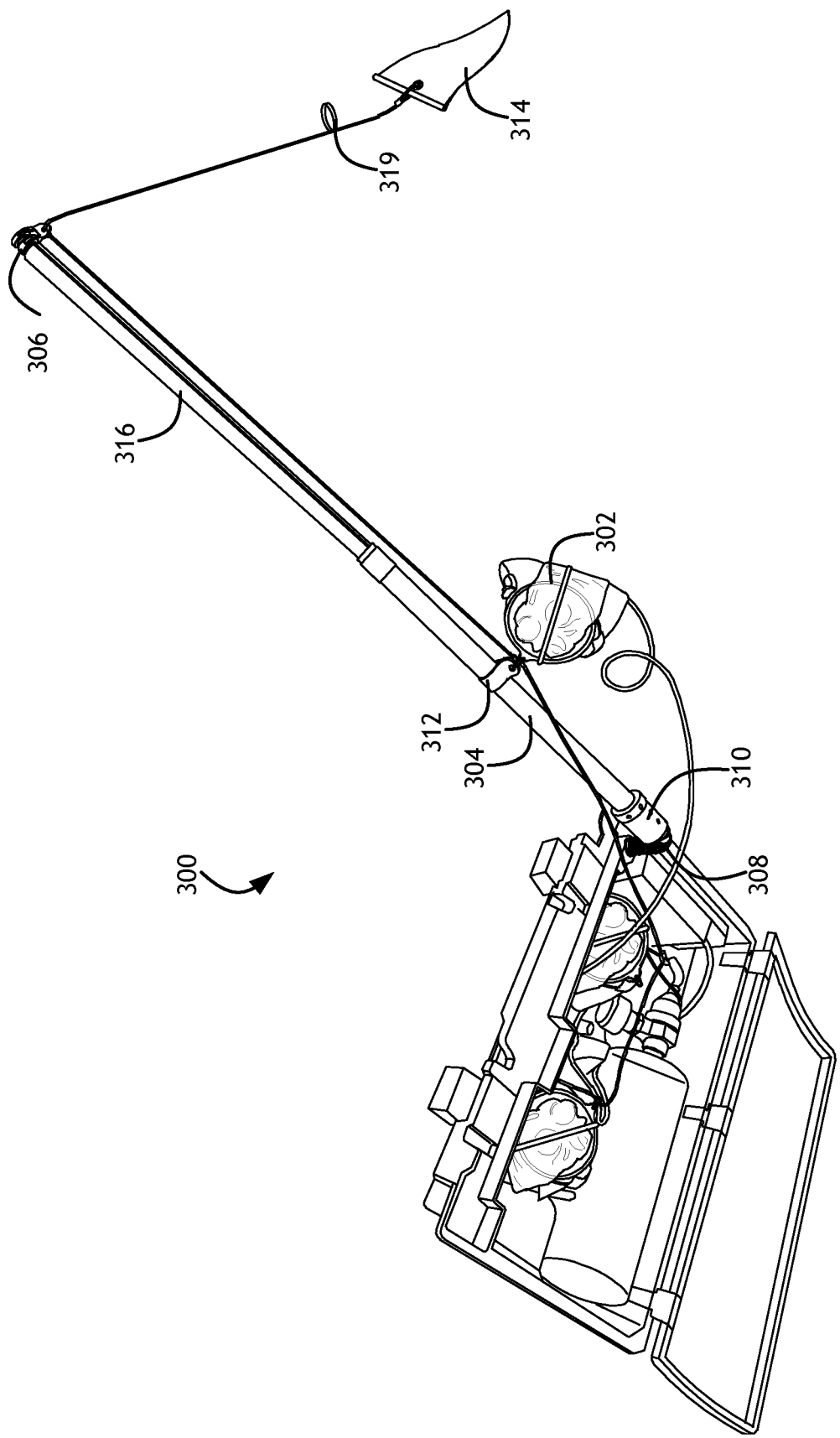
FIG. 3C shows a perspective view of an exemplary embodiment of a passenger oxygen mask extender according to the inventive concepts disclosed herein.
Figure 3D:
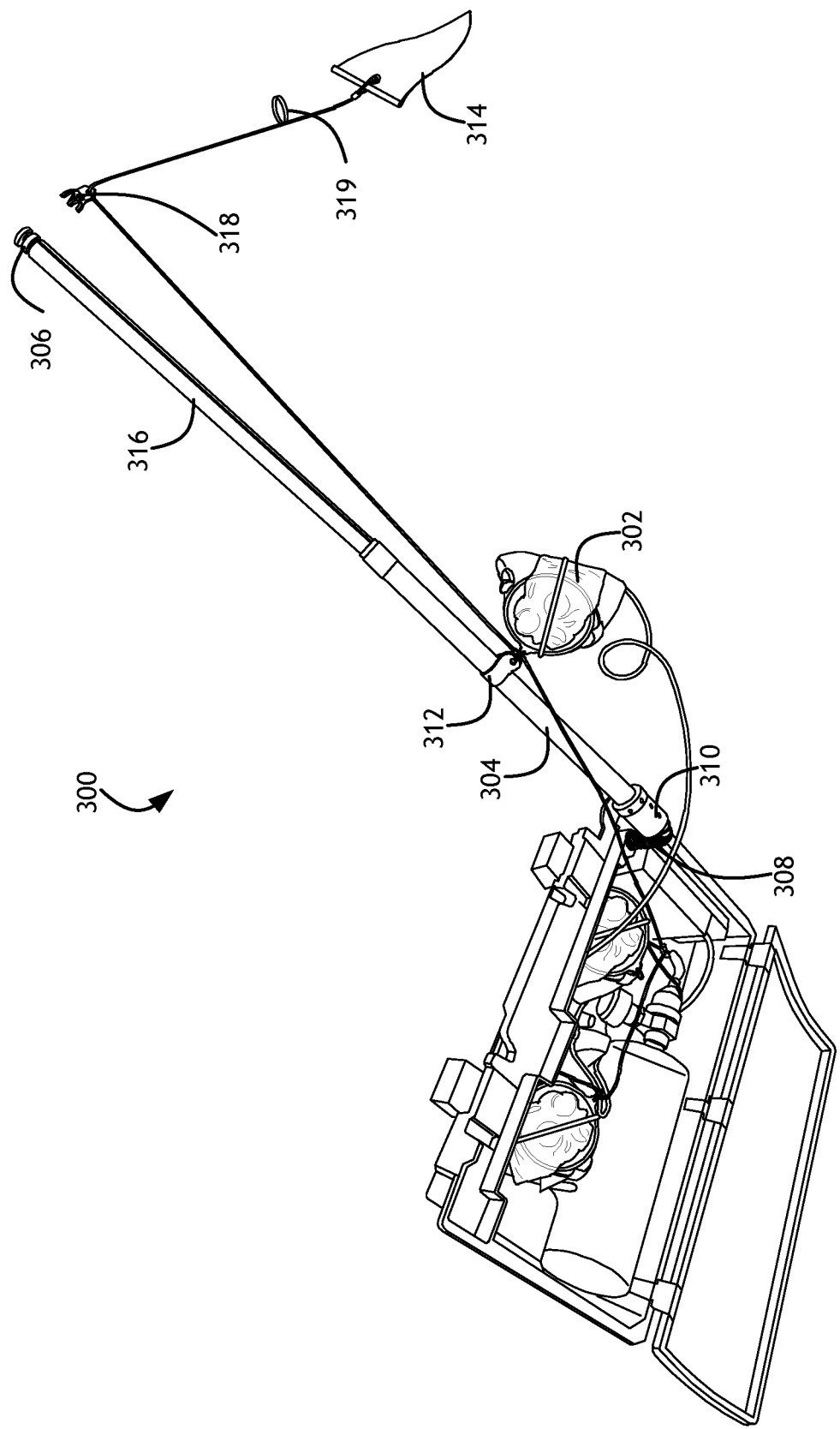
FIG. 3D shows a perspective view of an exemplary embodiment of a passenger oxygen mask extender according to the inventive concepts disclosed herein.
Figure 3E:
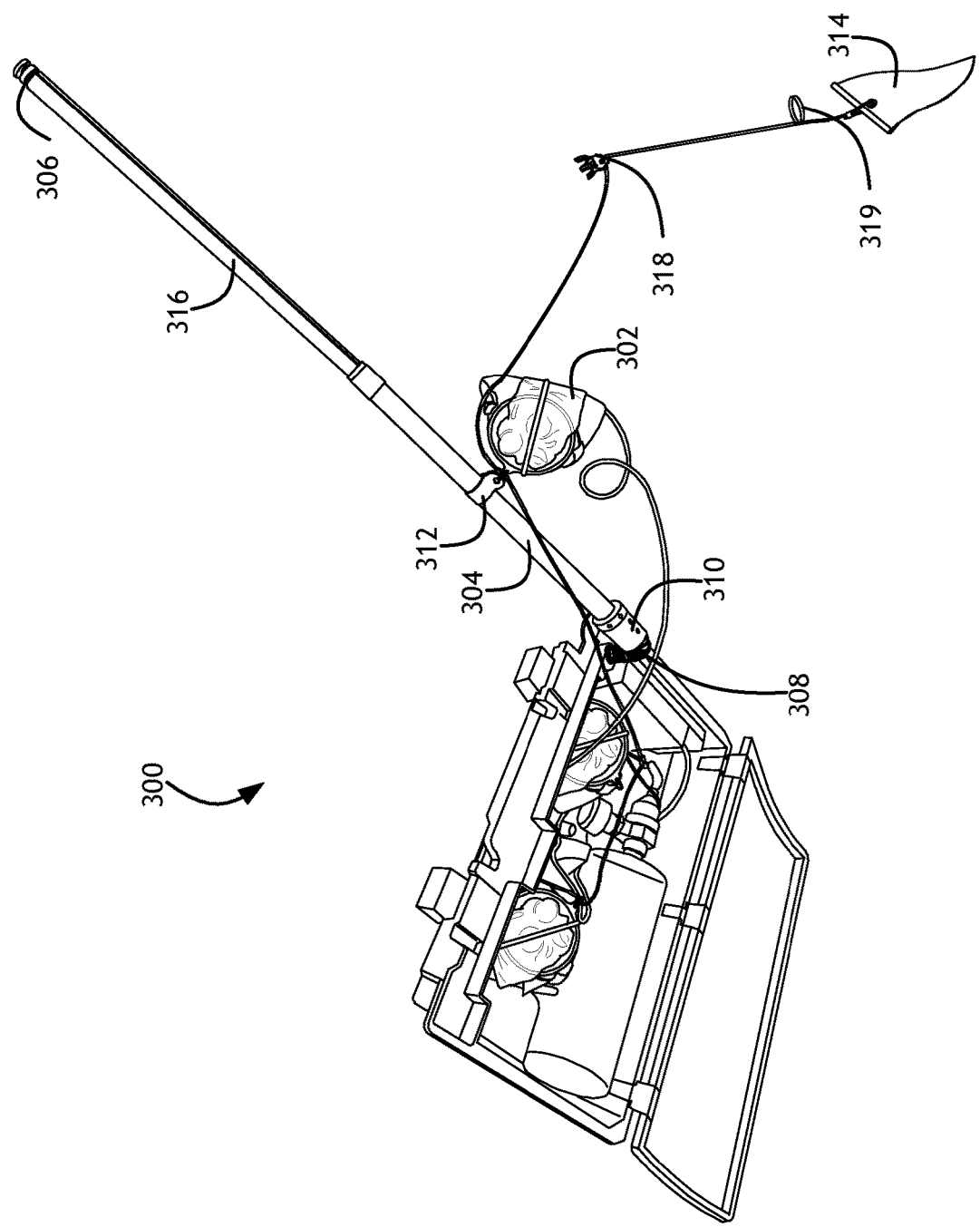
FIG. 3E shows a perspective view of an exemplary embodiment of a passenger oxygen mask extender according to the inventive concepts disclosed herein.

Referring to FIG. 2, a detail view of an exemplary embodiment of a rotating extender arm 200 according to the inventive concepts disclosed herein is shown. A guide block 202 disposed in or connected to the shell or structure of an in-cabin passenger oxygen mask system defines an extension shaft 204 along an axis to allow the extender arm 200 traveling within the extension shaft 204 to extend out of the shell or structure of the in-cabin passenger oxygen mask system. The guide block 202 also defines one or more rotation channels 206 configured to engage one or more corresponding rotation pins 208 disposed on the extender arm 200.

In at least one embodiment, an actuating mechanism such as a spring pushes the extender arm 200 along the extension shaft 204. While the extender arm 200 moves linearly within the extension shaft 204, the rotation pins 208 move within the rotation channels 206 to control and correlate the rotation of the extender arm 200 to the linear extension, thereby defining the extent and timing of rotation when the in-cabin passenger oxygen mask system is deployed.

In at least one embodiment, the rotation channels 206 each define a terminal rotation 207 disposed at a terminus of the corresponding rotation channel 206 such that the rotation pins 208 engage the corresponding terminal rotation 207 in a fully stowed state. The force of the spring pushing the extender arm 200 is absorbed by the guide block 202 via the terminal rotation 207. When a lid to the oxygen mask system opens, the extender arm 200 rotates slightly as defined by the path of the terminal rotation 207, then the extender arm 200 is ejected according to a straight path 209 of the corresponding rotation channel 206, then a larger final rotation begins as the rotation pins 208 engage a final rotation portion 211 of the rotation channel 206. The lid may include a pin to prevent the extender arm 200 from rotating in the terminal rotation 207 while the lid is closed so that the guide block 202 absorbs the force of the spring.

Referring to FIGS. 3A-3E, perspective views of an exemplary embodiment of a passenger oxygen mask extender according to the inventive concepts disclosed herein are shown at various stages of deployment. In at least one embodiment, an in-cabin passenger oxygen mask system 300, during a first stage of deployment (such as in FIG. 3A), releases an oxygen mask extender comprising an extender arm 304 and pull flag release mechanism 306. The oxygen mask extender is displaced linearly, driven via an actuator such as a spring 308. While moving linearly, the oxygen mask extender rotates, again via the stored energy of the spring 308 and a guide block configured to direct the rotation of the oxygen mask extender to a final orientation.

In at least one embodiment, during a second stage of deployment (such as in FIG. 3B), an extension release mechanism 310 releases a telescoping arm 316. In at least one embodiment, the telescoping arm 316 positions a pull flag 314 connected to an extendable oxygen mask 302 within reach of a passenger. In at least one alternative embodiment, the telescoping arm 316 is directly connected to the extendable oxygen mask 302.

In at least one embodiment, the extension release mechanism 310 is actuated via a force exerted by the spring 308 as the oxygen mask extender rotates into a final position as more fully described herein.

In at least one embodiment, during a third stage of deployment (such as in FIG. 3C), the telescoping arm 316 reaches a maximum extension and activates the pull flag release mechanism 306 to drop the pull flag 314, via a pull flag retention loop 319, while a specially adapted pull flag release clip 318 remains disposed on the telescoping arm 316 via tension. Alternatively, the release mechanism 306 may release the extendable oxygen mask 302 directly.

When a user pulls on the pull flag 314 with sufficient force to release the pull flag release clip 318, the pull flag 314 is dropped (as in FIG. 3E) in proximity to a corresponding passenger. The passenger may then pull on the pull flag 314 or extendable oxygen mask 302 to release an oxygen mask clip 312 if one is present. An oxygen mask clip 312 may be used to affix the extendable oxygen mask 302 to the extender arm 304 at a point closer to the pivot point than the pull flag release mechanism 306 to reduce overall stress on the pivot point, spring 308, and extension release mechanism 310 due to the weight of the extendable oxygen mask 302.

In at least one embodiment, the pull flag release clip 318 may be configured to release from the pull flag release mechanism 306 with a sufficient force applied to the pull flag 314, even if the pull flag release mechanism 306 fails to release the pull flag release clip 318 at full extension.

Figure 4:
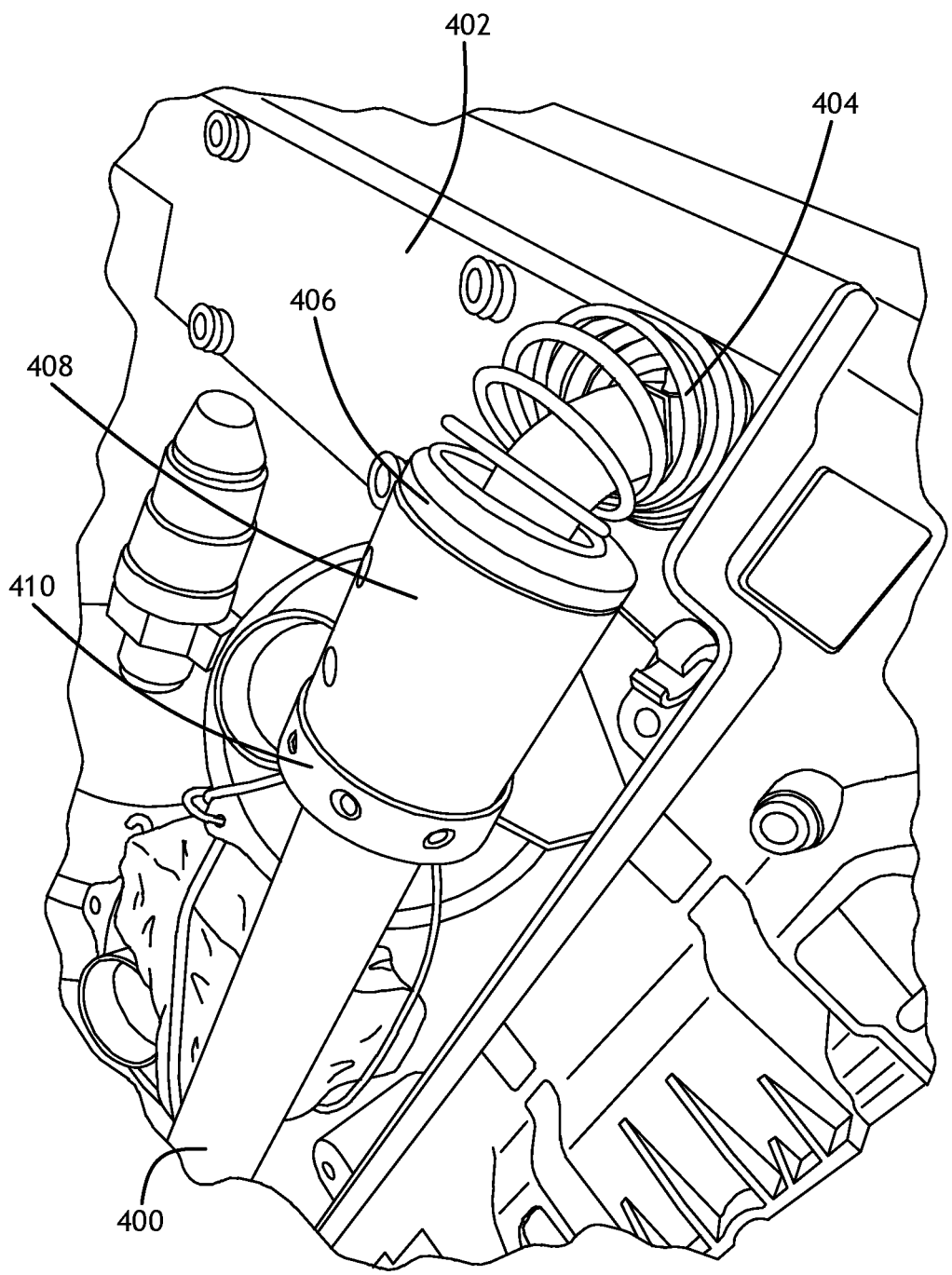
FIG. 4 shows a perspective, detail view of an exemplary embodiment of a rotating sleeve latch according to the inventive concepts disclosed herein.

Referring to FIG. 4, a perspective, detail view of an exemplary embodiment of a rotating sleeve latch according to the inventive concepts disclosed herein is shown. In at least one embodiment, an extender arm 400 including a telescoping arm element (not shown) is connected to the structure 402 of an in-cabin passenger oxygen mask system via a spring 404 and a rotating sleeve latch extension release mechanism consisting of an inner sleeve 406 with an end stop portion (see FIG. 5) fixed to the spring 404 and fixed to the extender arm 400, and an outer sleeve 408. A bearing 410 fixed to the outer sleeve 408 may reduce friction between the inner sleeve 406 and outer sleeve 408. As the extender arm 400 extends linearly away from the structure 402 and rotates via a rotation mechanism such as the exemplary guide block described herein, the spring 404 causes the outer sleeve 408 to rotate with respect the inner sleeve 406 an disengage one or more pins or bearings configured to retain the telescoping arm. The telescoping arm is thereby released to extend linearly.

Figure 5:
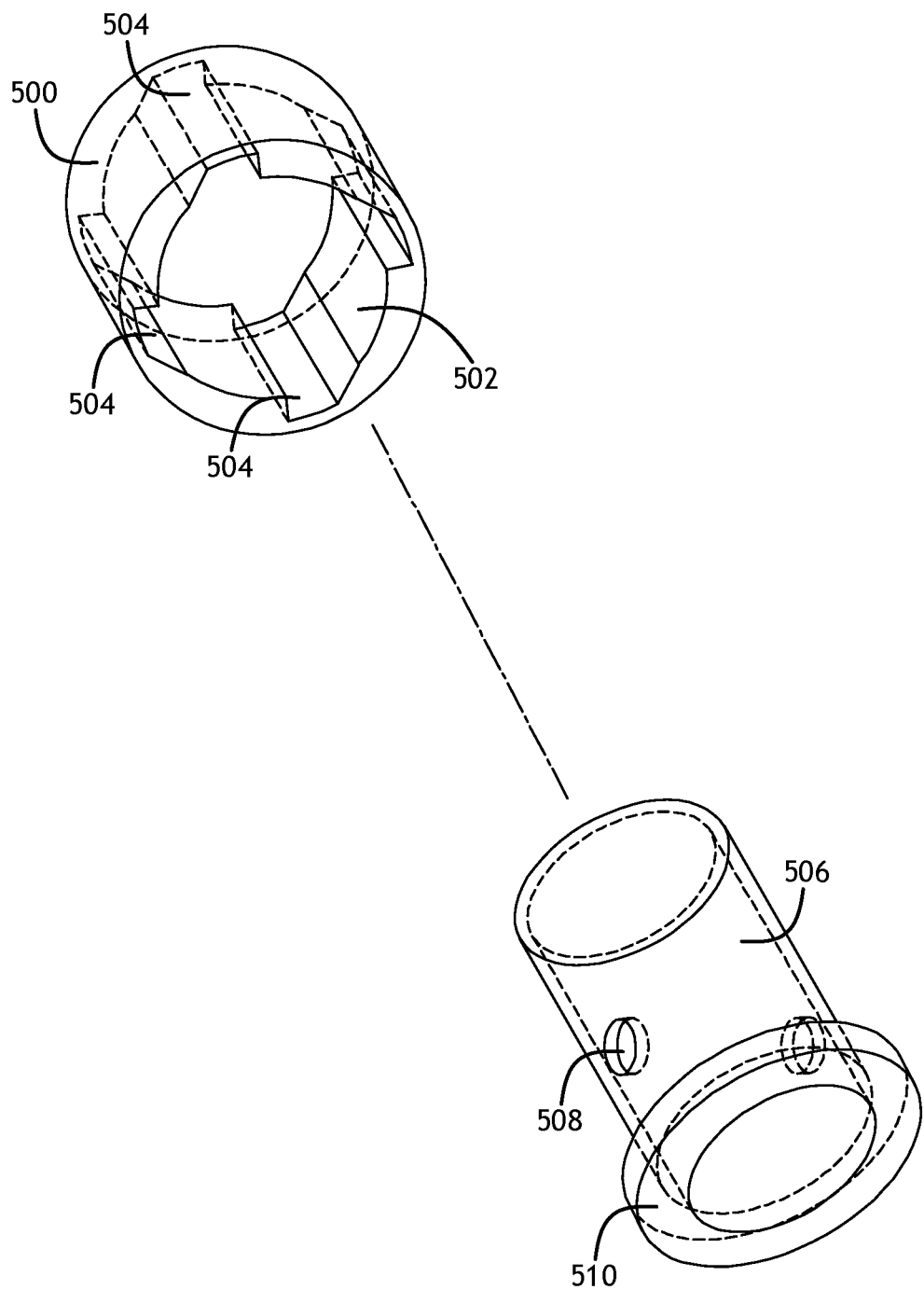
FIG. 5 shows a detail view of an exemplary embodiment of a rotating sleeve latch according to the inventive concepts disclosed herein.

Referring to FIG. 5, a detail view of an exemplary embodiment of a rotating sleeve latch according to the inventive concepts disclosed herein is shown. In at least one embodiment, an outer sleeve 500 defines one or more retention pin engaging surfaces 502 configured to oppose disengagement of one or more retention pins or bearings that restrict linear movement of a corresponding telescoping arm to retain the telescoping arm in a configuration with a compressed linear actuator, such as a spring. The outer sleeve 500 further defines one or more retention pin release channels 504 that allow the corresponding retention pins to release the corresponding telescoping arm when the outer sleeve 500 rotates about an inner sleeve 506.

In at least one embodiment, the inner sleeve 506 defines a plurality of retention pin holes 508 that define the locations of the retention pins with respect to the retention pin engaging surfaces 502and retention pin release channels 504. In at least one embodiment, the inner sleeve 506 comprises a portion of an extender arm where the telescoping arm is disposed within the extender arm. In at least one embodiment, the inner sleeve comprises an end stop portion 510, such as a collar, configured to abut the outer sleeve 500. The outer sleeve 500 will generally be absorbing the force of a spring pushing the outer sleeve 500 against the end stop portion 510.

Figure 6:
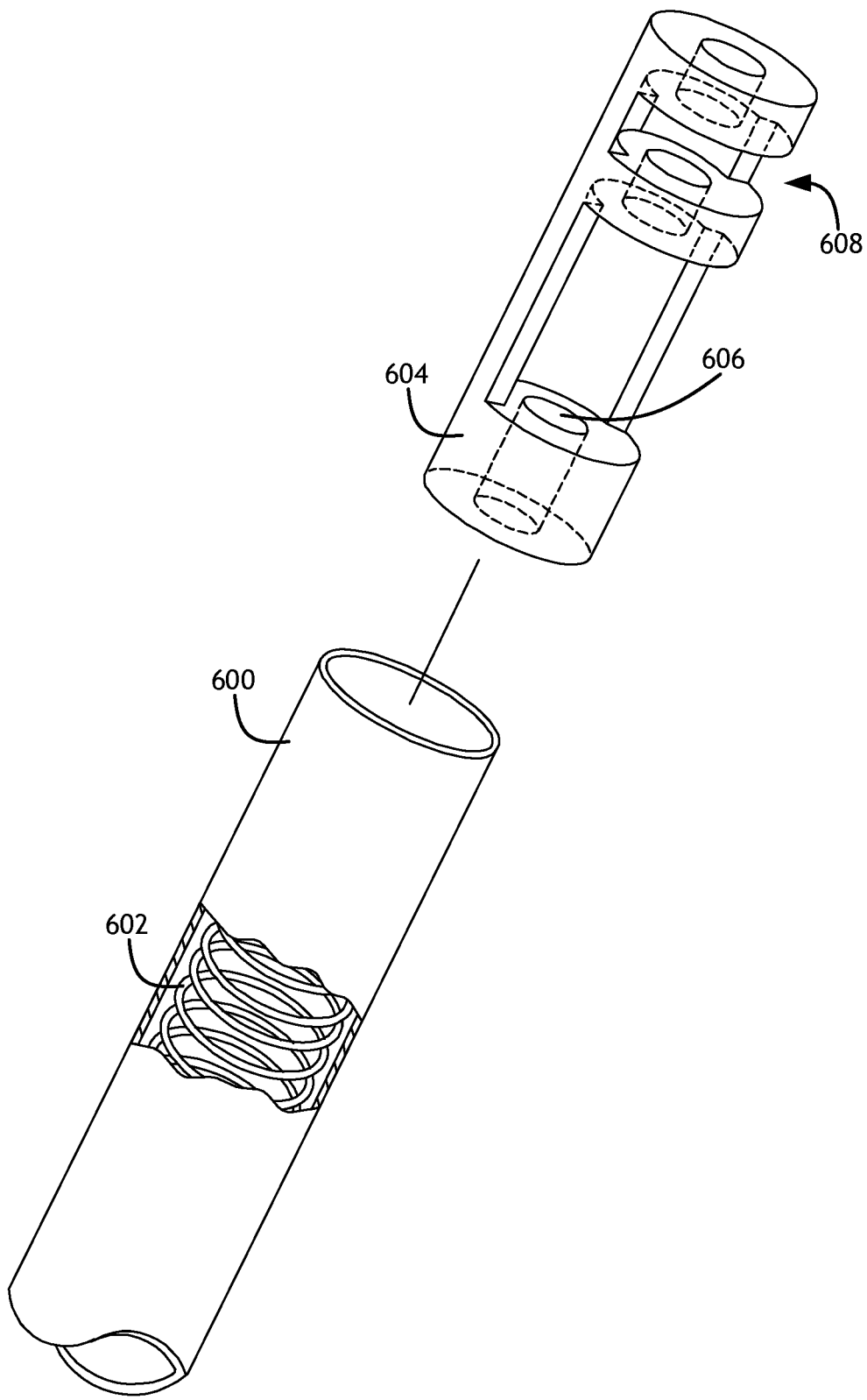
FIG. 6 shows a detail view of an exemplary embodiment of a pull flag release mechanism according to the inventive concepts disclosed herein.

Referring to FIG. 6, a detail view of an exemplary embodiment of a pull flag release mechanism 604 according to the inventive concepts disclosed herein is shown. An extender arm 600 (or a telescoping arm portion of an extender arm 600) includes an actuator such as a spring 602 configured to oppose approximal surface of the pull flag release mechanism 604. In at least one embodiment, the spring 602 (or other appropriate linear actuator) stores the energy necessary to displace the pull flag release mechanism 604 linearly.

In at least one embodiment, the pull flag release mechanism 604 defines a pin retention channel 606 and a pull flag loop recess 608. A pull flag is held in place via a pull flag retention pin within the pin retention channel 606. At full extension, the pull flag retention pin is displaced within the pin retention channel enough to free the pull flag loop from the pull flag loop recess 608. In at least one embodiment, a pull flag clip is held in place around the pull flag release mechanism 604 or extender arm via tension. When the pull flag loop is released, and the pull flag is pulled by a passenger with sufficient force to overcome the tension of the pull flag clip, the pull flag clip is released, potentially along with a corresponding oxygen mask.

Figure 7:
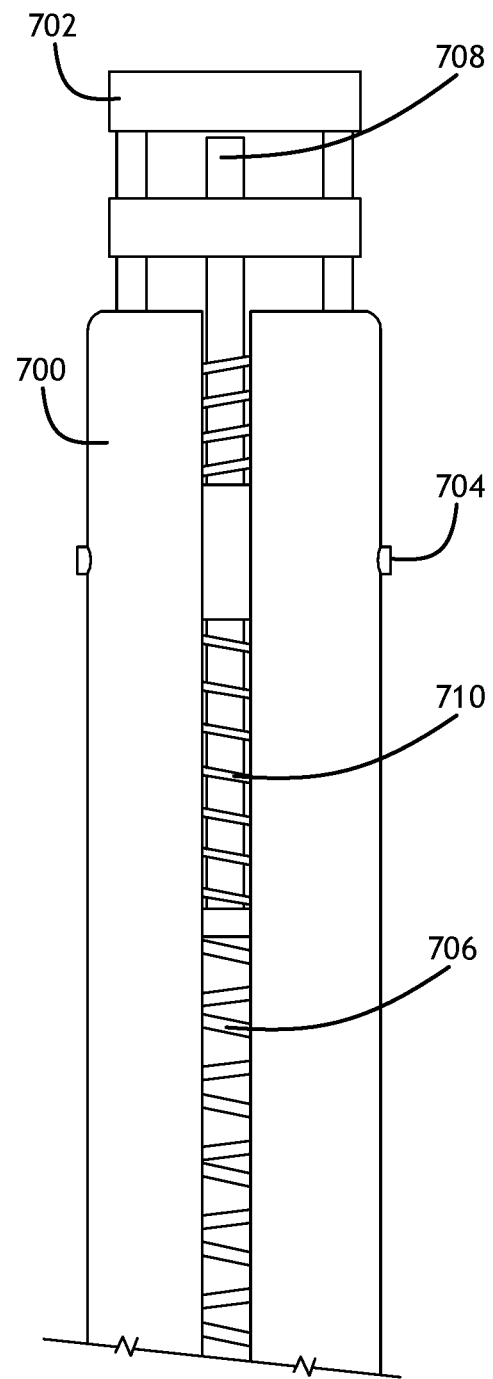
FIG. 7 shows a top view of an exemplary embodiment of a pull flag release mechanism according to the inventive concepts disclosed herein.

Referring to FIG. 7, a top view of an exemplary embodiment of a pull flag release mechanism 702 according to the inventive concepts disclosed herein is shown. An extender arm 700 (or a telescoping arm portion of an extender arm 700) includes a pull flag release mechanism 702 secured to a distal portion of the extender arm 700 or telescoping arm, such as via glue, friction, or mechanical fastener 704. An actuator, such as an extender arm spring 706, may abut a proximal surface of a pull flag retention pin 708. When the extender arm spring 706 is compressed, the force of the extender arm spring 706 pushes the pull flag retention pin 708 forward within a pin retention channel defined by the pull flag release mechanism 702 to secure a pull flag loop within a pull flag loop recess defined by the pull flag release mechanism 702.

In at least one embodiment, a pin release spring 710 or actuator is configured to apply a force opposing the extender arm spring 706. The pin release spring 710 is configured to apply a force to the pull flag retention pin 708 such that when the extender arm 700 is fully extended, the combined forces of the extender arm spring 706 and pin release spring 710 work to disengage the pull flag pin 708 from the pull flag loop recess and thereby release a corresponding pull flag clip.

Figure 8A:
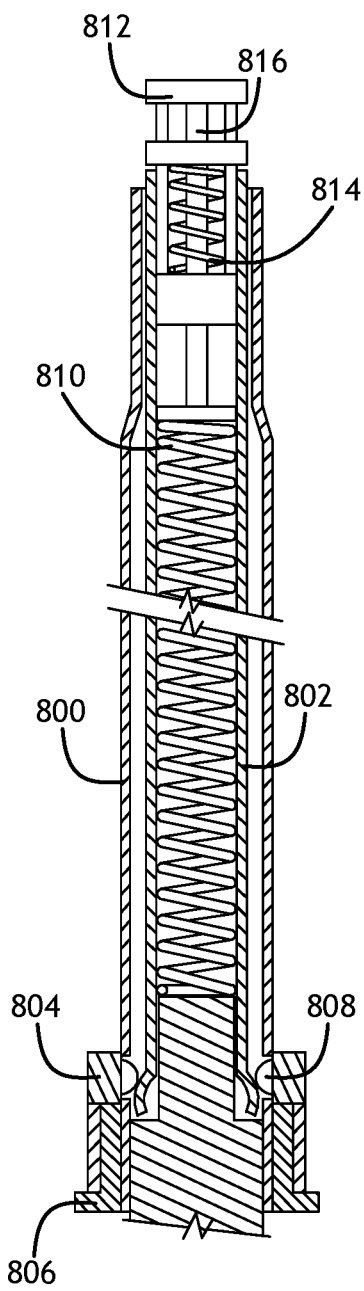
FIG. 8A shows a top, detail, sectional view of an exemplary embodiment of a passenger oxygen mask extender arm according to the inventive concepts disclosed herein.
Figure 8B:
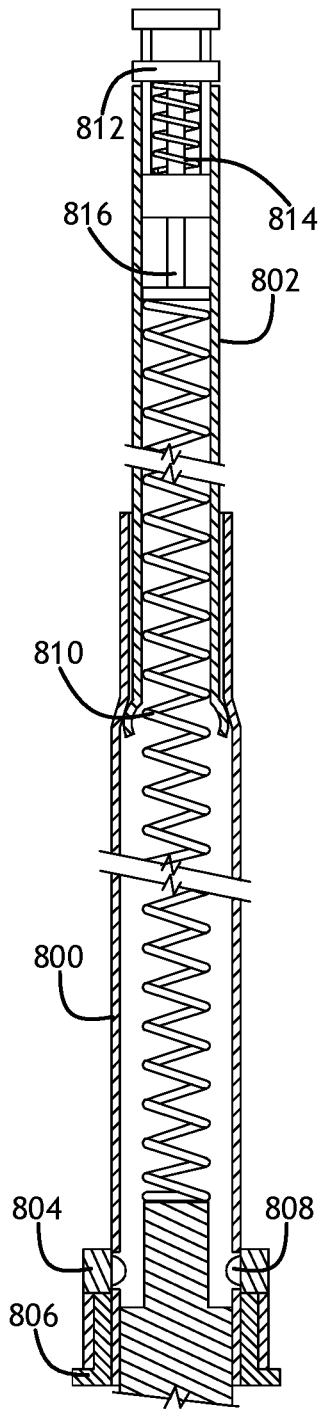
FIG. 8B shows a top, detail, sectional view of an exemplary embodiment of a passenger oxygen mask extender arm according to the inventive concepts disclosed herein.

Referring to FIGS. 8A-8B, top, detail, sectional views of an exemplary embodiment of a passenger oxygen mask extender according to the inventive concepts disclosed herein are shown. The passenger oxygen mask extender includes an extender arm 800 and a telescoping arm 802 disposed within the extender arm 800. In at least one embodiment, the extender arm 800 comprises a crimp distal portion and the telescoping arm 802 includes a fluted proximal portion such that when fully extended the fluted proximal portion abuts the crimped distal portion to stop the telescoping arm 802. Furthermore, the fluted proximal portion may be engaged by a rotating sleeve latch comprising an outer sleeve 804, and inner sleeve 806, and a plurality of latch bearings 808. In a compressed configuration (as in FIG. 8A), the outer sleeve 804 provides a surface to abut the plurality of latch bearings 808 and for them to protrude through openings in the inner sleeve 806. The protruding latch bearings abut the fluted proximal portion to keep an extension actuator, such as an extension spring 810, compressed. The energy necessary to extend the telescoping arm 802 is thereby maintained internally, absorbed by the outer sleeve 804 or inner sleeve 806, or both, of the rotating sleeve latch in a compressed state; no pneumatic or electric components are necessary to extend the telescoping arm 802.

When the outer sleeve 804 rotates, the latch bearings may be pushed out of the way by the fluted proximal portion and the telescoping arm 802 is extended by the extension spring 810 (as in FIG. 8B). At maximum extension, the fluted proximal portion of the telescoping arm 802 abuts the crimped distal portion of the extension arm 800. At full extension, the force that the extension arm spring 810 applies to a pull flag release mechanism 812 disposed in the distal portion of the telescoping arm 802 is sufficiently reduced such that a pin release spring 814 pushes against a pull flag retention pin 816 to disengage the pull flag retention pin 816 from a pull flag loop recess defined by a distal portion of the pull flag release mechanism 812 and allow a pull flag to drop so that a passenger can grab the pull flag and thereby pull down an oxygen mask.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. An oxygen mask extension system comprising:
   an extension arm comprising one or more rotation pins disposed on a surface of the extension arm;
   a guide block defining an extension shaft and one or more rotation channels, the one or more rotation channels configured to engage a corresponding rotation pin and direct rotation of the extension arm while the extension arm travels linearly within the extension shaft;
   a telescoping arm disposed within the extension arm; and
   an extension release mechanism configured to release the telescoping arm when the extension arm has rotated into a final position.

2. The oxygen mask extension system of claim 1, wherein the extension release mechanism comprises:
   an inner sleeve defining one or more retention pin holes configured retain retention pins or bearings;
   an outer sleeve defining one or more pin engaging surfaces and one or more pin release channels;
   wherein:
      the outer sleeve surrounds the inner sleeve such that the one or more pin engaging surfaces so that corresponding retention pins or bearing retain the telescoping arm in a compressed configuration; and
      the outer sleeve is configured to rotate such that at some point of rotation the one or more pin release channels align with the retention pins or bearing to release the telescoping arm to an extended configuration.

3. The oxygen mask extension system of claim 1, further comprising a pull flag release mechanism comprising:
   a body defining a pull flag loop recess and a pin retention channel; and
   a pull flag retention pin configured to engage the pin retention channel,
   wherein the pull flag release mechanism is configured to engage a distal portion of the telescoping arm.

4. The oxygen mask extension system of claim 3, further comprising:
   an extension arm spring; and
   a pin release spring,
   wherein:
      the extension arm spring is configured to bias the pull flag retention pin to engage the pull flag loop recess in a compressed configuration; and
      the pin release spring is configured to bias the pull flag retention pin to disengage the pull flag loop recess in an extended configuration.

5. The oxygen mask extension system of claim 1, wherein:
   the telescoping arm comprises a fluted proximal portion; and
   the extension arm comprises a crimped distal portion,
   wherein the fluted proximal portion and crimped distal portion are configured to engage in an extended configuration.

6. The oxygen mask extension system of claim 5, wherein the extension release mechanism comprises:
   an inner sleeve defining one or more retention pin holes configured retain retention pins or bearings;
   an outer sleeve defining one or more pin engaging surfaces and one or more pin release channels;
   wherein:
      the outer sleeve surrounds the inner sleeve such that the one or more pin engaging surfaces so that corresponding retention pins or bearing retain the telescoping arm in a compressed configuration by abutting the fluted proximal portion; and
      the outer sleeve is configured to rotate such that at some point of rotation the one or more pin release channels align with the retention pins or bearing to release the telescoping arm to an extended configuration.

7. The oxygen mask extension system of claim 6, further comprising a rotation spring configured to engage the guide block and the outer sleeve, wherein the rotation spring applies a force to cause the extension arm to travel linearly within the extension shaft and a rotational force to the outer sleeve to disengage the retention pins or bearings.

8. A method placing an oxygen mask within reach of a passenger comprising:
   linearly extending an oxygen mask extension arm while simultaneously rotating the oxygen mask extension arm via a guide block defining an extension shaft and one or more rotation channels;
   after the oxygen mask extension arm is rotated into a final position, extending a telescoping arm; and
   releasing one of an oxygen mask or a pull flag connected to an oxygen mask.

9. The method of claim 8, further comprising rotating an outer sleeve about an inner sleeve to disengage one or more retention pins or bearings to release the telescoping arm.

10. The method of claim 9, wherein rotating the outer sleeve comprises rotating the outer sleeve with a rotation spring affixed to the guide block to apply a rotational force to the outer sleeve when the oxygen mask extension arm rotates.

11. The method of claim 8, further comprising retracting a pull flag retention pin from a pull flag loop recess to release the oxygen mask or pull flag.

12. The method of claim 11, wherein retracting the pull flag retention pin comprises decompressing an extension spring while extending the telescoping arm and simultaneously applying a force to push the pull flag retention pin out of the pull flag loop recess via a pin release spring.

13. The method of claim 8, further comprising stopping the extension of the telescoping arm by abutting a fluted proximal portion of the telescoping arm to a crimped distal portion of the oxygen mask extension arm.

14. An aircraft comprising:
   an oxygen mask extension system comprising:
      an extension arm comprising one or more rotation pins disposed on a surface of the extension arm;
      a guide block defining an extension shaft and one or more rotation channels, the one or more rotation channels configured to engage a corresponding rotation pin and direct rotation of the extension arm while the extension arm travels linearly within the extension shaft;
      a telescoping arm disposed within the extension arm; and
      an extension release mechanism configured to release the telescoping arm when the extension arm has rotated into a final position.

15. The aircraft of claim 14, wherein the extension release mechanism comprises:
   an inner sleeve defining one or more retention pin holes configured retain retention pins or bearings;
   an outer sleeve defining one or more pin engaging surfaces and one or more pin release channels;
   wherein:
      the outer sleeve surrounds the inner sleeve such that the one or more pin engaging surfaces so that corresponding retention pins or bearing retain the telescoping arm in a compressed configuration; and the outer sleeve is configured to rotate such that at some point of rotation the one or more pin release channels align with the retention pins or bearing to release the telescoping arm to an extended configuration.

16. The aircraft of claim 14, further comprising a pull flag release mechanism comprising:
a body defining a pull flag loop recess and a pin retention channel; and
a pull flag retention pin configured to engage the pin retention channel,
wherein the pull flag release mechanism is configured to engage a distal portion of the telescoping arm.

17. The aircraft of claim 16, further comprising:
an extension arm spring; and
a pin release spring,
wherein:
the extension arm spring is configured to bias the pull flag retention pin to engage the pull flag loop recess in a compressed configuration; and
the pin release spring is configured to bias the pull flag retention pin to disengage the pull flag loop recess in an extended configuration.

18. The aircraft of claim 14, wherein:
the telescoping arm comprises a fluted proximal portion; and
the extension arm comprises a crimped distal portion,
wherein the fluted proximal portion and crimped distal portion are configured to engage in an extended configuration.

19. The aircraft of claim 18, wherein the extension release mechanism comprises:
an inner sleeve defining one or more retention pin holes configured retain retention pins or bearings;
an outer sleeve defining one or more pin engaging surfaces and one or more pin release channels;
wherein:
the outer sleeve surrounds the inner sleeve such that the one or more pin engaging surfaces so that corresponding retention pins or bearing retain the telescoping arm in a compressed configuration by abutting the fluted proximal portion; and
the outer sleeve is configured to rotate such that at some point of rotation the one or more pin release channels align with the retention pins or bearing to release the telescoping arm to an extended configuration.

20. The aircraft of claim 19, further comprising a rotation spring configured to engage the guide block and the outer sleeve, wherein the rotation spring applies a force to cause the extension arm to travel linearly within the extension shaft and a rotational force to the outer sleeve to disengage the retention pins or bearings.

* * * * *